United States Patent
Gesch et al.

(10) Patent No.: US 6,874,051 B2
(45) Date of Patent: Mar. 29, 2005

(54) SYSTEM CARRIER FOR FREELY PROGRAMMABLE BLOCKS

(75) Inventors: Helmuth Gesch, Tiefenbach (DE); Markus Waidelich, München (DE)

(73) Assignee: IsarTec GmbH, Landshut (DE)

(*) Notice: Subject to any disclaimer, the term of this patent is extended or adjusted under 35 U.S.C. 154(b) by 265 days.

(21) Appl. No.: 10/204,024

(22) PCT Filed: Dec. 14, 2000

(86) PCT No.: PCT/EP00/12712
§ 371 (c)(1),
(2), (4) Date: Aug. 15, 2002

(87) PCT Pub. No.: WO01/61852
PCT Pub. Date: Aug. 23, 2001

(65) Prior Publication Data
US 2003/0005198 A1 Jan. 2, 2003

(30) Foreign Application Priority Data
Feb. 18, 2000 (DE) ..................... 200 03 010 U

(51) Int. Cl.[7] ................. G06F 13/00; H05K 7/02; H05K 7/10
(52) U.S. Cl. .............. 710/300; 710/301; 326/39; 361/736
(58) Field of Search ................. 710/300–305, 710/315; 361/777, 728, 760.785, 736, 764; 326/39, 41; 439/151, 267; 708/200; 709/253

(56) References Cited

U.S. PATENT DOCUMENTS

| | | | |
|---|---|---|---|
| 5,000,692 A | * 3/1991 | Taniguchi et al. | ........... 439/160 |
| 5,424,589 A | 6/1995 | Dobbelaere et al. | |
| 5,434,592 A | * 7/1995 | Dinwiddie et al. | ......... 345/629 |
| 5,703,759 A | 12/1997 | Trimberger | |
| 5,935,232 A | 8/1999 | Lambrecht et al. | |
| 6,351,786 B2 | * 2/2002 | Elmore et al. | ............... 710/303 |
| 6,577,730 B1 | * 6/2003 | Weir et al. | .................... 379/329 |

FOREIGN PATENT DOCUMENTS

EP 227 028 7/1987

OTHER PUBLICATIONS

"Extensible digital–signal–processing modules for real–time control and simulation" by Yan Guo; Lee, H.C.; Boon–Teck Ooi (abstract only) Publication Date: Nov. 15–19, 1993.*

"The performance of three CAMAC controllers in a real world simulation" by Piercey, R.B. (abstract only) Publication Date: Jun. 14–18, 1999.*

* cited by examiner

Primary Examiner—Gopal C. Ray
(74) Attorney, Agent, or Firm—Cohen, Pontani, Lieberman & Pavane

(57) ABSTRACT

A system carrier for freely programmable blocks that are connected to one another by buses, of a carrier body, at least three identically configured connectors disposed on the carrier body and being configured to receive in each case one module with a freely programmable block, the module being couplable to the connector and its position changable, and three groups of buses arranged to fixedly connect the connectors to one another.

8 Claims, 7 Drawing Sheets

SYSTEM CARRIER FOR FREELY PROGRAMMABLE BLOCKS

PRIORITY CLAIM

This is a U.S. national stage of application No. PCT/EP00/12712, filed on 14 Dec. 2000. Priority is claimed on that application and on the following application:

Country: Germany, Application No.: 200 03 010.8, Filed: 18 Feb. 2000.

BACKGROUND OF THE INVENTION

The invention relates to a system carrier for freely programmable blocks (gate arrays) that are connected to one another by means of buses.

In the development of complex integrated circuits (IC) first of all logic designs are created, which are based on a speech-based description in a programming language, the hardware description language (HDL) as it is known. For the purpose of functional verification of highly integrated microelectronic circuits, it is usual to use logic simulation in the development phase. As a supplement to the simulation, in recent years specific platforms for the logic emulation have been used. The circuit, which is present as a network list and is to be verified, was partitioned onto freely programmable logic blocks (FPGA) which are connected by means of specific programmable switching matrices. This technique is known as rapid prototyping. The developer is therefore made capable of testing the circuit on the platform in an early development phase of a logic design before said circuit is cast in silicon.

The drawback with this system is that, because of the switching matrix, considerable propagation time delays have to be tolerated, which makes the verification of the logic design more difficult or even impossible. Added to this is the fact that the programmable blocks are placed fixedly on the platform and are connected to one another via the switching matrix by likewise fixed connections.

SUMMARY OF THE INVENTION

The invention is based on the object of providing a universally usable system carrier which operates without a switching matrix, so that very short and always fixedly predeterminable signal propagation times are achieved and the system can be verified in real time.

In the case of a system carrier of the generic type outlined at the beginning, according to the invention this object is achieved by at least three identically configured connectors for receiving in each case one module with a freely programmable block (gate array) being disposed on the system carrier, it being possible for said module to be coupled to the connector and its position changed, the connectors being fixedly connected to one another by means of three groups of buses.

The significant advantage is therefore achieved that the system carrier, which is initially present as an unconfigured board, merely contains a fixed bus system. Only after being fitted with the modules, which contain freely programmable blocks and have a coincident architecture, is the system board given its logic function as a result of programming and can be used immediately. With the aid of the individually configurable blocks, which can be placed in variable positions, it is possible quickly to produce an optimum connection which is matched to the intended purpose via the bus system, which permits different access to the electronic capabilities of the board. As a result of the modular construction of the system, the further advantage results that recourse can always be had to available FPGA blocks of different size, and the most recent technological generation of FPGA blocks can be used.

In each module, the freely programmable block is fixedly connected to a circuit board, from the underside of which plug-in pins project, which can be plugged into corresponding receiving seats in the connectors. The configuration of the plug-in pins and of the receiving seats is symmetrical in this case.

If the configuration of the plug-in pins and the receiving seats has point symmetry, each module can be coupled to the connector in two different positions by being rotated through 180°. In addition, it is also conceivable to produce different positions of the modules by means of longitudinal displacement on the connector.

Each of the bus groups has different tasks and, if appropriate, also data transmission capacities. In a first group of buses (private buses), each bus in each case connects two connectors directly to each other. By means of the second group of buses (local buses), all the connectors are connected to one another. The third group of buses (global buses) connects all the connectors to one another and, in addition, produces a link with a further system carrier. The architecture of the system carrier therefore permits a plurality of system carriers to be connected in parallel in order to expand the capacity.

Some of the buses can additionally be connected to a memory.

BRIEF DESCRIPTION OF THE DRAWINGS

The invention is explained below using an exemplary embodiment which is illustrated in the drawing, in which.

DETAILED DESCRIPTION OF THE PREFERRED EMBODIMENTS

Figure 2:
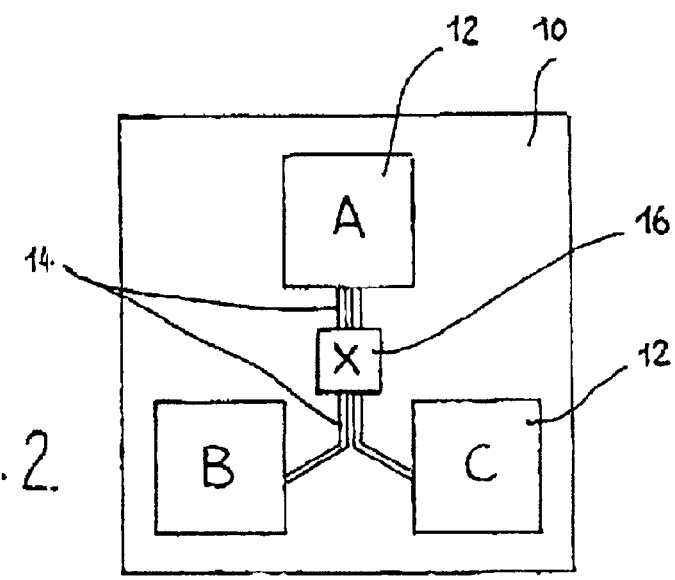
FIG. 2 shows the schematic view of a conventional board, in which the blocks are connected to a common switching matrix via fixed wiring.

FIG. 2 shows the prior art already explained with a system carrier (board 10), on which a total of three programmed blocks A, B, C are fixedly placed. The blocks (modules 12) are connected to one another and to a switching matrix 16 via likewise fixed connecting lines 14 (buses). As already mentioned, such a system is not flexible, as a result of which production and application for emulation purposes are expensive and time-consuming. In addition, it is a considerable drawback that the switching matrix 16 does not cause predictable propagation time delays, so that no real-time capability is achieved.

Figure 1:
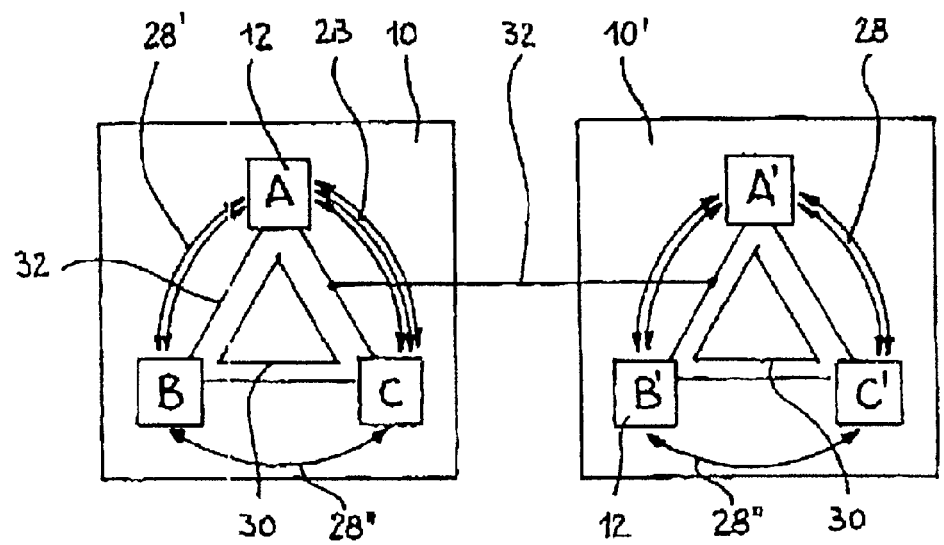
FIG. 1 shows the schematic view of two system carriers (boards) according to the invention each having a fixed bus system.

In FIG. 1, two system carriers (boards 10, 10') constructed in accordance with the invention are illustrated schematically, each of which likewise carries three modules 12 with freely programmable FPGA blocks A, B, C but the latter are not situated fixedly on the board 10 but can be interchanged and additionally changed in their position.

Figure 5:
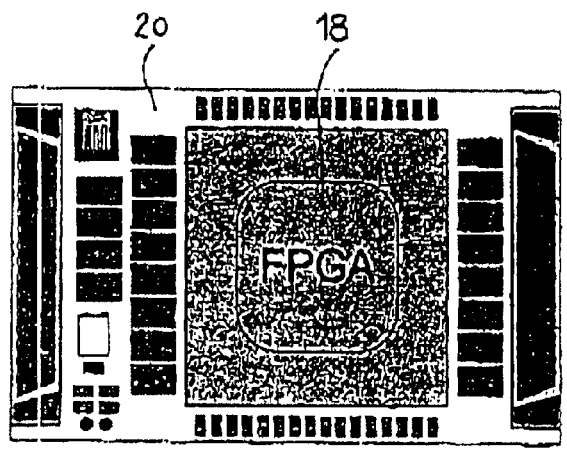
FIG. 5 shows the plan view of the module of FIG. 4.
Figure 4:
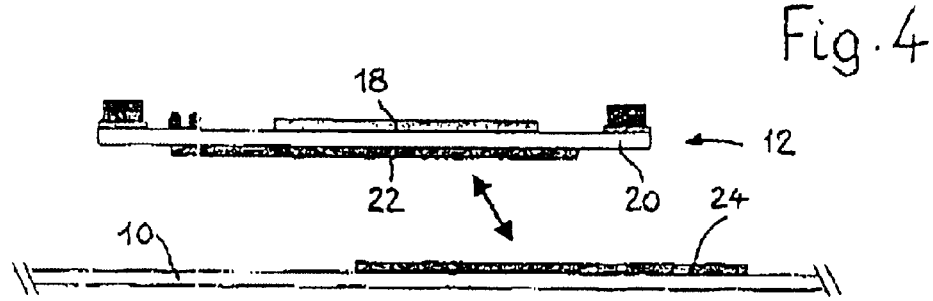
FIG. 4 shows the sectional illustration of part of the system carrier with a connector onto which a module has been plugged.
Figure 6:
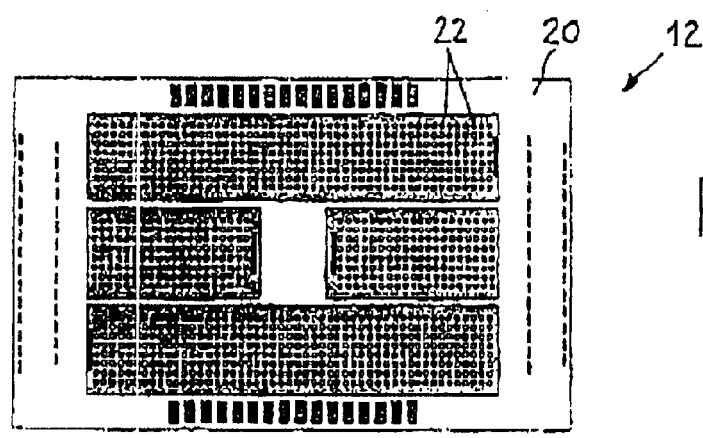
FIG. 6 shows the underneath view of the module.

In FIGS. 4 to 6, it is indicated schematically that each module 12 contains a freely programmable gate array block (FPGA) 18, which is permanently fitted to a circuit board 20. From the underside of the circuit board 20, plug-in pins 22 project, which can be plugged into corresponding receiving seats 26 of connectors 24 which are provided on the system carrier (board 10) (cf. also FIG. 7).

Figure 7:
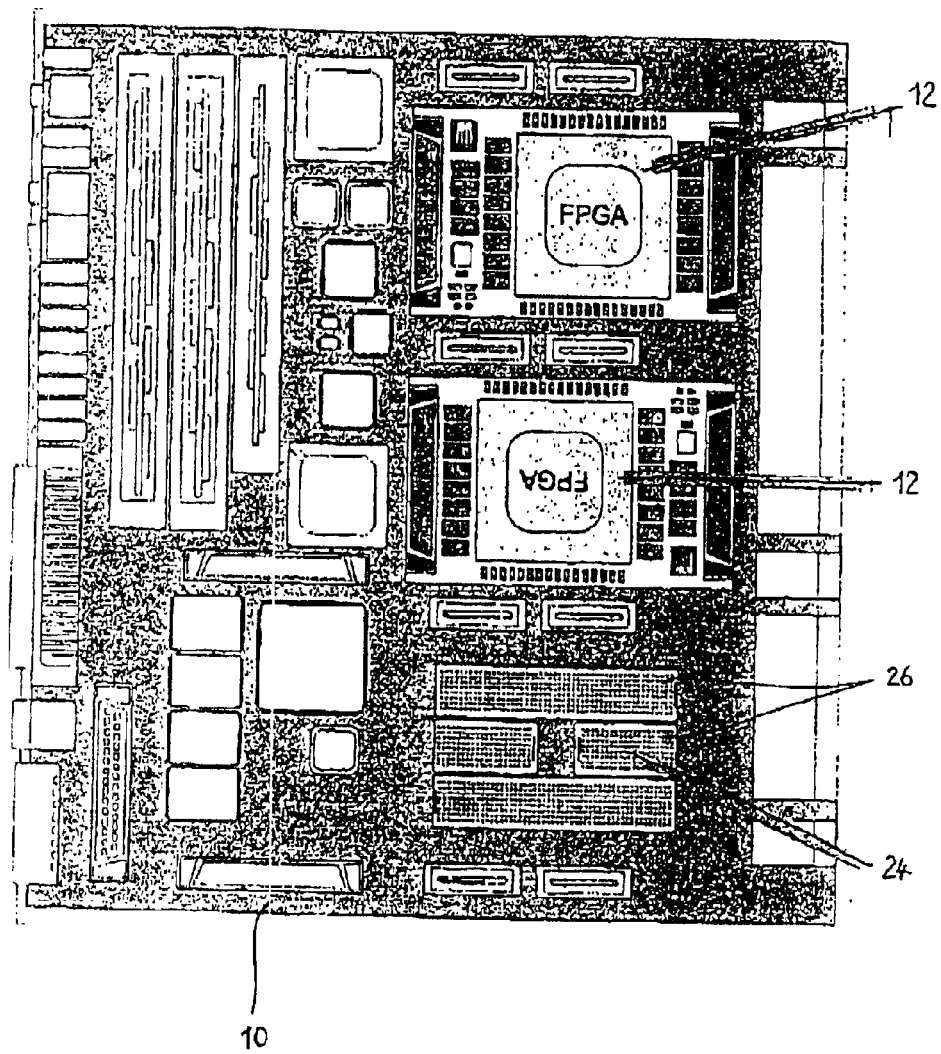
FIG. 7 shows the plan view of a system carrier (board) with possible layout and without electrical wiring.

FIG. 7 shows the plan view of one possible embodiment of the system carrier 10 without electrical wiring with three connectors 24, it being possible for the connector 24 with its receiving seats 26 to be seen in the lower part of FIG. 7, while the two other connectors are each occupied by a module 12. A comparison of FIGS. 6 and 7 reveals that the configuration of the plug-in pins 22 on the underside of the module 12 and the receiving seats 26 of the connector 24 correspond to one another, it being possible to see a symmetry both with regard to the two axes and also with regard to the center. This results in the extremely advantageous possibility of fitting each module 12 in at least two different positions on the connector 24. In the case of point symmetry, two different positions on the connector 22 can be produced by means of rotation of the modules 12 through 180°, which will be described in more detail further below. In addition, it is also conceivable, given appropriate configuration of the connectors 24 and of the plug-in pins 22, to achieve different positionings by displacing the modules 12 relative to the connector 24.

For the capability to use the system carrier 10 universally, it is also significant that the latter is equipped with a fixed bus system. FIG. 1 indicates that all three connectors 24 provided for the modules 12 on the board 10 are connected to one another in pairs by means of private buses 28 illustrated in a ring shape. The private buses 28 can have different capacities and tasks, which is symbolized in FIG. 3 by the bus 28 shown as a continuous line, the bus 28' reproduced dashed and the bus 28" indicated dash-dotted.

A second group of buses is formed by the local buses 30, as they are known, which connect all the connectors 22 on the board 10 to one another. These local buses 30 are shown as zigzag lines in FIG. 3.

Figure 3:
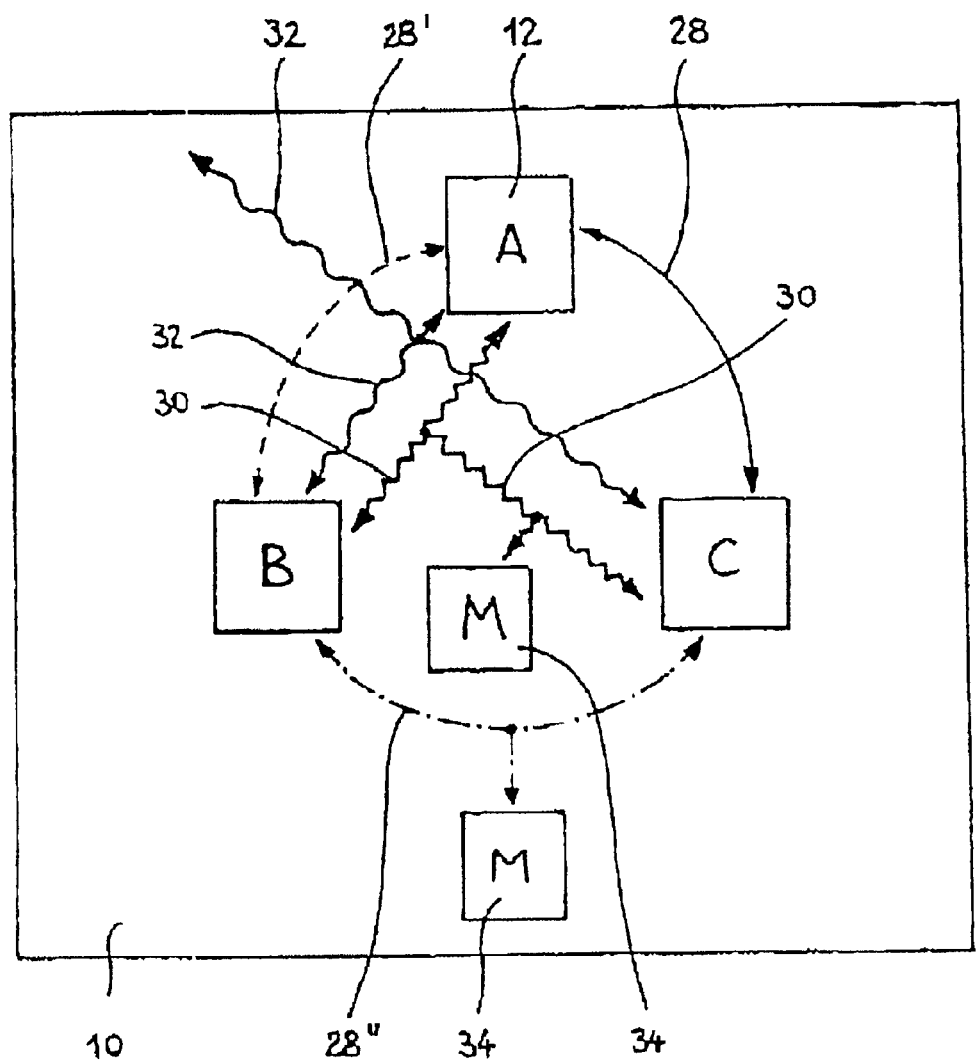
FIG. 3 shows a schematic view of a system carrier according to the example of FIG. 1.

Finally, the third group of buses is formed by global buses 32, as they are known, which are symbolized in FIG. 3 as wavy lines and which connect all the connectors 24 to one another and in addition produce a connection to a further system carrier, to the system carrier 10' in the example of FIG. 1. By means of the global bus 32, a plurality of system carriers can therefore be connected together in order to expand the overall system.

Finally, FIG. 3 indicates that the private bus 28" is connected to a memory 34 and one of the local buses 30 is connected to another memory 34'.

Figure 8:
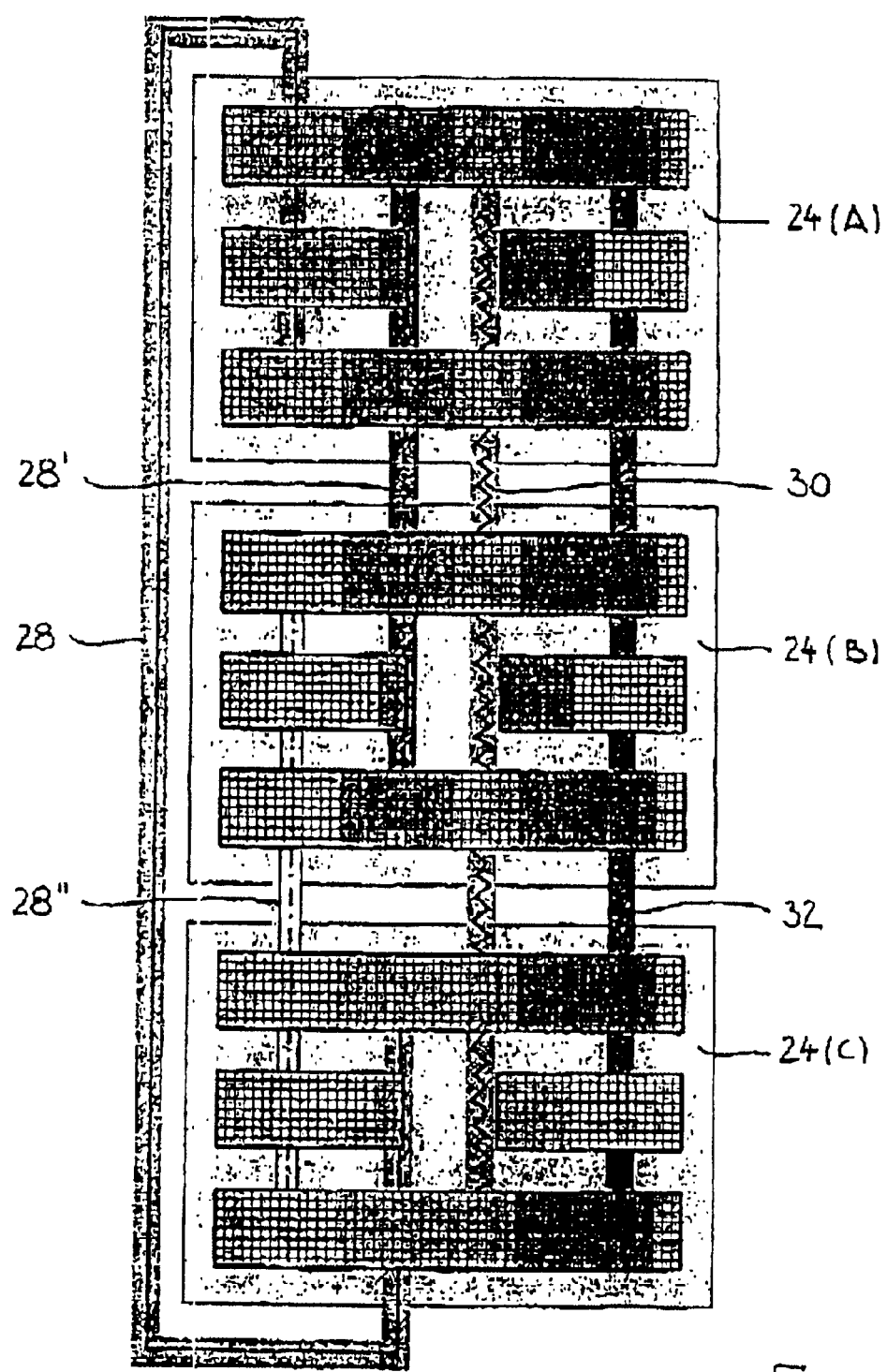
FIG. 8 shows a detail from the board of FIG. 7 with bus system and possible fitting with modules with maximum utilization of all the buses.

FIG. 8 shows a detail from the right-hand part of FIG. 7 with the three connectors 24A, 24B, 24G, which are connected to one another by the private buses 28 (continuous lines), 28' (dashed lines) and 28" (shown dash-dotted). In accordance with FIG. 3, the local buses 30 are shown as zigzag lines and the global buses 32 as wavy lines.

All three connectors 24A, 14B, 24C of FIG. 8 are occupied by modules 12 whose freely programmable blocks 18 (FPGA) are programmed in such a way that the result is full utilization which is indicated in FIG. 8 by the completely occupied pin groups of different gray tones, which correspond to the gray tones of the connected buses.

Figure 9:
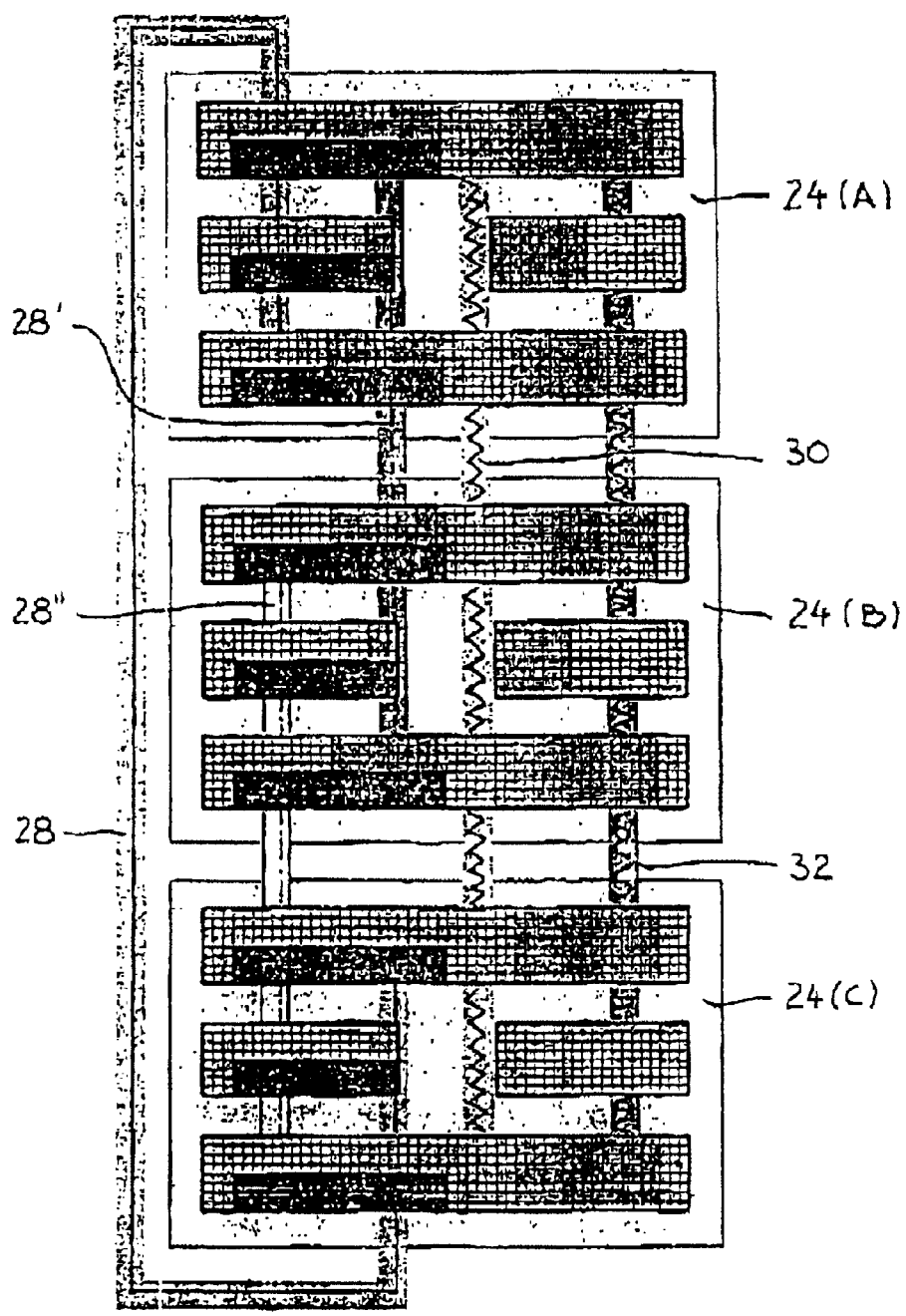
FIG. 9 shows a variant of FIG. 8 with partial utilization of the buses and FIG. 10 shows a view corresponding to FIG. 9 with different positioning of the modules.
Figure 10:
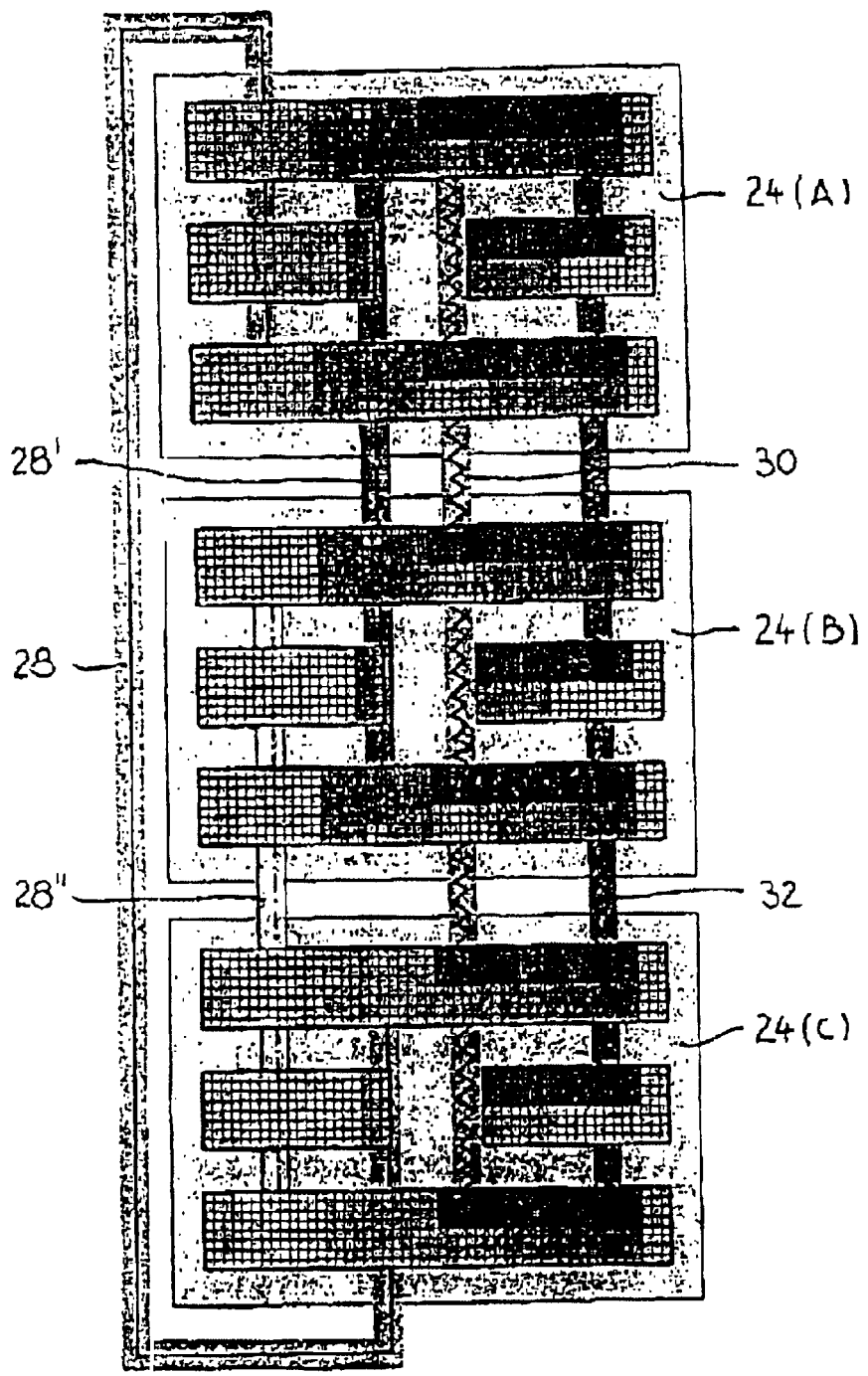

FIGS. 9 and 10 show an application example in which in each case the result is not maximum utilization of the buses, but only different partial utilizations. Here, too, again all the plug-in pins 22 of the FPGA blocks 18 are connected to one another by the buses, but are not completely electrically occupied; the unoccupied regions are drawn in black. For example, in FIG. 9, because of partial occupancy of the left-hand halves of the modules A, B, C, the private buses 28, 28', 28" are only partially utilized, while the local buses 30 and the global buses 32 are utilized completely (right-hand parts of the connectors 24 in FIG. 9).

Then if, as indicated in FIG. 10, the modules A, B, C are rotated through 180°, their only partially occupied regions, which previously lay in the left-hand part, are connected to the private buses 28, 28', 28", so that the latter are now fully utilized.

From this, by means of simple rotation or, as indicated, displacement, of the modules 12, the result is that the capacity and the different intended use of the buses can be used optimally. One of the intended uses can be, for example, access to a memory 34.

In the invention, there is the possibility of operating the system with only one or two modules or of using modules which are smaller than the connectors 24, so that—as indicated—the different positioning can be produced by displacement instead of by rotation.

The advantages of the invention are primarily to be seen in the fact that a far-reaching real-time capability is implemented, so that many different circuit designs can be simulated and a subsequently implemented semiconductor circuit can be simulated in terms of function and time behavior. Since no switching matrix is required in order to connect critical signal paths, the very short signal propagation times can be predicted.

The fixed bus structure permits optimal signal connection of the freely programmable gate arrays to one another. The result of the modular construction is that the FPGAs can be chosen freely and can be interchanged with one another and positioned so that the internal bus structure is utilized in an optimal way.

What is claimed is:

1. A system carrier for freely programmable blocks that are connected to one another by buses, comprising: a carrier body; at least three identically configured connectors disposed on the carrier body and being configured to receive in each case one module with a freely programmable block, said module being couplable to the connector and its position changable; and three groups of buses arranged to fixedly connect the connectors to one another.

2. The system carrier as defined in claim 1, wherein each freely programmable block is fixedly connected to a circuit board, plug-in pins being arranged to project from an underside of the circuit board, the connectors having receiving seats that correspond to the plug-in pins and which receive the plug-in pins.

3. The system carrier as defined in claim 2, wherein the plug-in pins and the receiving seats have a symmetrical configuration.

4. The system carrier as defined in claim 3, wherein the configuration of the plug-in pins and of the receiving seats has point symmetry so that the module is couplable to the connector in two different positions by being rotated through 180°.

5. The system carrier as defined in claim 1, wherein in a first group of buses each bus in each case connects two connectors directly to each other.

6. The system carrier as defined in claim 5, wherein a second group of buses connects all the connectors to one another.

7. The system carrier as defined in claim 6, wherein a third group of buses connects all the connectors to one another and, in addition, produces a connection to a further system carrier.

8. The system carrier as defined in claim 1, and further comprising a memory connected to an individual one of the buses.

* * * * *